Nov. 28, 1961  D. G. MOORE  3,010,129
PERAMBULATING KITCHEN APPLIANCES AND CONTROL MEANS THEREFOR
Filed Nov. 4, 1957  2 Sheets-Sheet 2

INVENTOR.
DONALD G. MOORE
BY
ATTORNEYS

United States Patent Office 3,010,129
Patented Nov. 28, 1961

3,010,129
PERAMBULATING KITCHEN APPLIANCES AND CONTROL MEANS THEREFOR
Donald G. Moore, St. Joseph, Mich., assignor to Whirlpool Corporation, St. Joseph, Mich., a corporation of Delaware
Filed Nov. 4, 1957, Ser. No. 694,147
5 Claims. (Cl. 15—1)

The present invention relates to improvements in home appliances, and more specifically relates to appliances which must be moved to perform their functions, or to appliances whose functions will be improved by movement between locations and to achieving complete automation in the operation of these appliances.

An important objective of the invention is to provide improvements in home appliances which reduce the attention and effort expended by the operator to an absolute minimum and enable the operation of certain appliances by merely operating a control switch at a location remote from the appliance.

Another object of the invention is to provide improvements in home appliances which perform an operational function while traveling, such as floor cleaners or the like, wherein they may be operated without the necessity of the operator following the appliance during its operation.

Another object of the invention is to provide an improved appliance of the type which performs a conditioning operation to a household surface, such as a floor, wherein the surface will be completely and uniformly covered by the conditioning appliance.

Another object of the invention is to provide an improved traveling appliance for the home wherein the prescribed path of travel between locations may be established, and the appliance will automatically follow said path in order to perform its prescribed function.

A further object of the invention is to provide an improvement in an appliance which performs a function at an operating location, and is stored during intermediate time periods in a storage location, and wherein the appliance will automatically travel to the operational location for performing its function, and can be automatically returned to the storage location.

A still further object of the invention is to provide automation for a mobile home appliance wherein the location and operation of the appliance can be controlled by the housewife at a position of rest without paying continued attention to the operation of the appliance.

Another more specific object of the invention is to provide an automatic dishwashing machine which may be automatically controlled to move from a storage location to a serving location where soiled dishes are loaded into the washer, and automatically returned to its storage location, thereby reducing the manual work necessary for loading the dishwasher and operating same.

Other objects and advantages will become more apparent with the teaching of the principles of the invention and the disclosure of a structure embodying the principles thereof in the specification, claims and drawings, in which:

Figure 1:
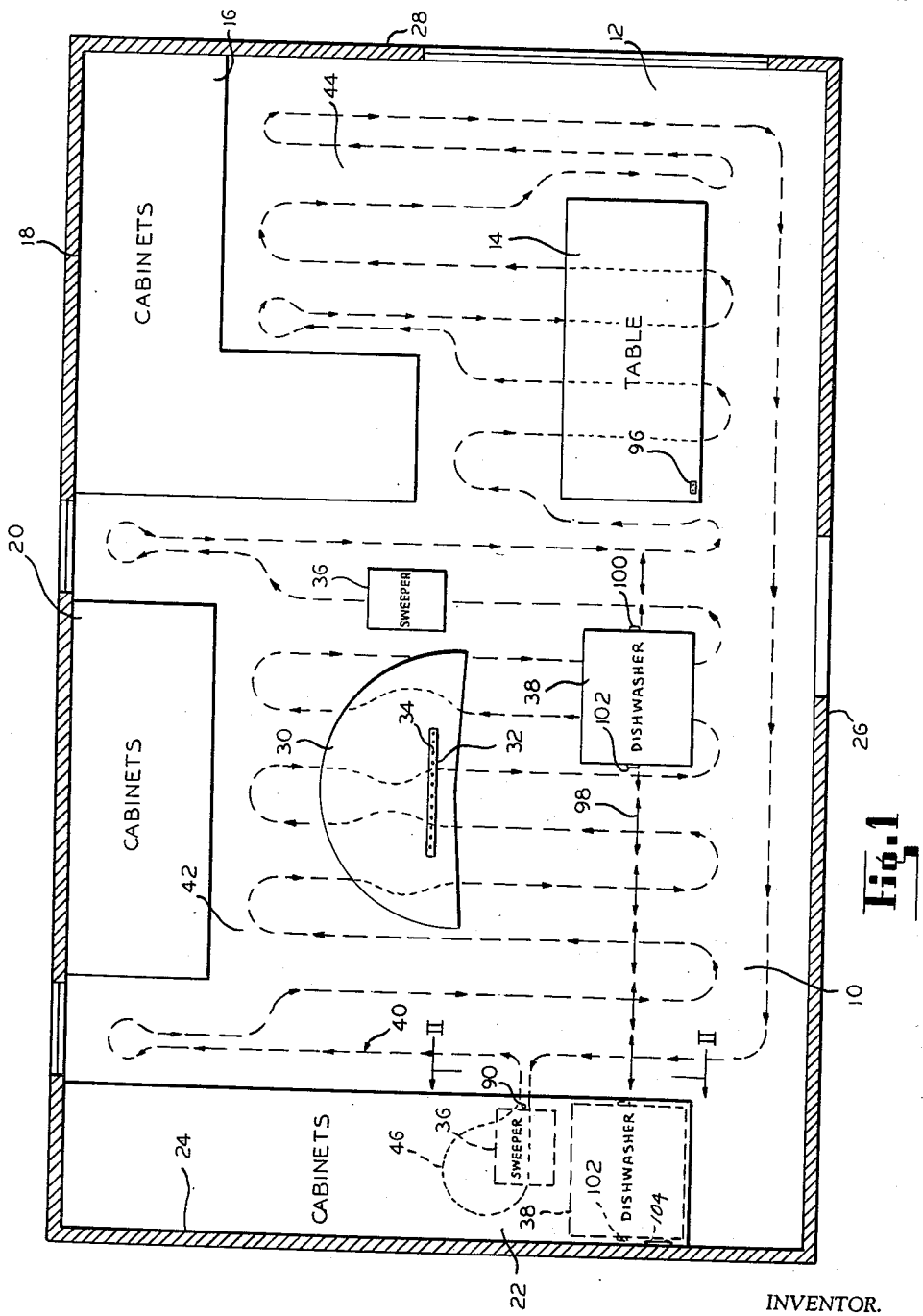
FIGURE 1 is a plan view of a floor in a home adapted to utilize the appliances embodying the principles of the present invention.

Although the invention is disclosed by way of illustration as employing certain appliances with the structural arrangement as illustrated, it will be understood that the features of the invention may be employed in other environments, and are not necessarily restricted to the exact arrangement shown. FIGURE 1 of the drawings shows a sectional view taken through several rooms of a domestic household representing occupancy areas for the family with area 10 being a kitchen and area 12 being a serving and dining area. Within the dining area 12 is a serving and dining table 14, and the cabinets 16 may be located along the wall 18. The kitchen area 10 is shown as having cabinets 20 along the wall 18 and cabinets 22 along a wall 24. Walls 26 and 28 complete the enclosure for the area being described. The kitchen is shown as also containing a counter 30, which is provided with an electrical control panel 32.

The electrical control panel 32 contains a number of switches such as 34, which are controlled by the operator or housewife in actuating automatic appliances for performing the necessary functions in maintaining the household.

In performing these necessary household functions, a number of appliances are ambulant in nature and must be moved about in order to perform their designated functions. As an example of this, a floor conditioning mechanism, such as a sweeper or vacuum cleaner 36, is utilized in the present invention. Other devices are utilized in performing household functions which are not necessarily ambulant, but the function of which is improved if they can be moved to an operating location. An example of this is a dishwasher 38. The operation of the washer will be enhanced and the energy expended by the housewife reduced, if the dishwasher can be moved to a location where the soiled dishes may be placed directly into the dishwasher without carrying them to the place where the dishwasher is stored or permanent housed. At such a location is the table 14 which is used for serving and dining, and at the end of the dining period the dishwasher may be moved to the table 14 whereupon the serving and eating utensils may be placed directly into the washer.

A feature of the present invention is to provide means whereby these ambulant household appliances may be automatically moved from a first location to a second location over a predefined prescribed path of travel. In the instance of some appliances, the path of travel is critical as to its function as in the case of the floor sweeper which must thoroughly and uniformly cover the floor area in order to effectively perform its cleaning function. In other appliances the path of travel is not the essential portion of the automation which is ascribed to the appliance by the present invention, but the end location of the travel is important, such as is the case with the dishwasher which must terminate its travel at the location of the soiled dishes. In both cases it is important that the appliance be accurately and automatically returned to the first location which is shown as a place of storage, as indicated by the dotted line location of the sweeper 36 and the dishwasher 38 in FIGURE 1.

The path of travel for the sweeper is shown by the arrowed dotted lines 40, which follow a tortuous path of travel across the floor 42 in the kitchen area 10 and the floor 44 in the dining area 12. The path of travel is shown in a preferred form as constituting reversing horizontal paths so that the sweeper or cleaner 36 will uniformly cover the entire floor area, and will not retrace its path. This not only will insure complete coverage of the entire floor area, but will insure an even coverage. Such a path may be prescribed which is well adapted to be followed by vehicles such as floor waxers or other type of cleaning equipment wherein the uniformity of coverage is important, and an operation can be performed which is superior to that performed by manually following the appliance and directing it in a path of travel. It will be recognized that numerous paths can be defined and the path 40 is arranged to give uniform coverage to the floor and to avoid collision with the cabinets 16, 20 and 22, and with the supporting legs of the control panel 32 or of the table 14. The path is arranged so that sweeper 36 will return to its storage cabinet 22 to the dotted line position from whence it started. For this purpose, the path 40 has a loop 46 at the end to turn the sweeper whereupon it will face outwardly for starting a new cleaning operation.

The sweeper is provided with power means for driving it along its path of travel as well as steering means to insure that it will continue along the prescribed path. Control means are also provided to insure that the sweeper will start and stop when a signal is sent from a control panel and when it returns to its housing cabinet 22.

Figure 3:
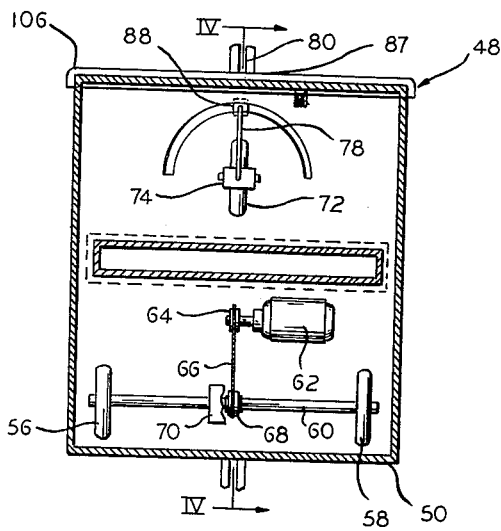
FIGURE 3 is a plan view of the vehicular means for moving the appliance with the top of the appliance removed; and, FIGURE 4 is a vertical sectional view taken along line IV—IV of FIGURE 3.
Figure 4:
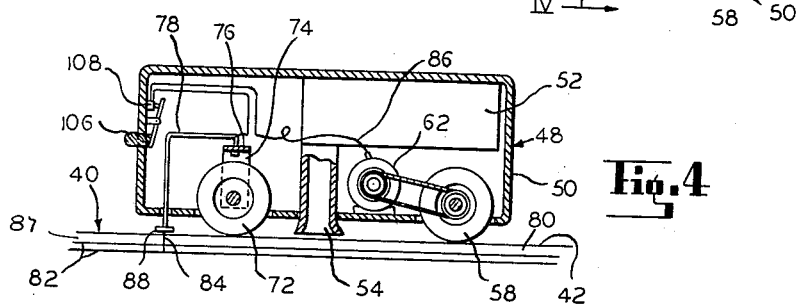

The above-referred-to operational control mechanisms are shown in a simplified form in FIGURES 3 and 4. FIGURES 3 and 4 show the vehicular means for transporting the appliance along the predetermined path of travel. While the vehicle shown will be described in connection with a cleaning mechanism, a similar vehicle will be provided for the dishwasher, and, therefore, only one need be described in detail.

The vehicle 48 is provided with a base frame 50 from which the appliance is supported and to which transporting and guiding elements are connected. As shown in FIGURE 4, the frame 50 supports the cleaning mechanism, shown diagrammatically at 52. For the cleaning operation a floor contacting projection 54 is provided which extends downwardly to be in close proximity to the floor. This may be a floor scrubbing arrangement, or may be in the form of a vacuum cleaner for sucking the dirt off of the floor.

The vehicle 48 is supported at its rear end on wheels 56 and 58, which are secured to a cross-shaft 60.

An electric motor 62 operates to provide motor power for the vehicle and has a drive train comprising a drive sprocket 64 or the like driving a chain 66 which passes over a driven sprocket 68 to drive the axle shaft 60 and the wheels 56 and 58. A housing 70 may be provided around the driven sprocket or the housing 70 may represent a differential for permitting the vehicle to easily turn around corners.

The front end of the vehicle is supported on a single wheel 72 completing a tricycle support. The wheel is carried on a fork 74 which is pivotally connected at its top 76 to pivot about a vertical axis. Connected to the fork is an arm 78 which is turned downwardly to extend toward the floor 42.

In the example herein described, the travel path 40 is defined by a slot 80 in the floor. Beneath this slot are electrical lines 82 which supply electricity to contacts 84 in sliding engagement with the lines 82 and supported on the steering arm 78. The contacts 84 connect to wires 86 which lead to the motor 62 to supply electrical energy for driving the vehicle 48.

For steering the vehicle, one side of the slot may be provided with a metal strip 87 formed of ferromagnetic material. This strip is followed by a magnet 88 mounted on the end of the steering arm 78. The magnet 88 will follow the metal strip and will steer the front wheel so that the vehicle will follow the path prescribed by the metal strip which is laid along the path 40, as shown in FIGURE 1.

It will be understood that the power means for driving the vehicle, the steering means for guiding it, and the energy pick-up means for supplying electricity to the power driving means are shown in simplified forms and other arrangements may be utilized, as will be recognized by those skilled in the art.

Control of the sweeper to start it on its automatic trip is obtained from a remote control switch such as may be contained on the control panel 32. When this switch is actuated, the sweeper is automatically started and will follow its path of travel and automatically return to its housing cabinet 22 and then stop. For example, operation of a control switch 34 may energize the power lines 82, thus starting the sweeper on its journey, and a stop arm 90 may be provided to be engaged by the sweeper after it returns to its cabinet 22, and turns around to be in position for a new trip. The stop arm 90 is so arranged so that when it is engaged by the sweeper heading in the direction shown in FIGURE 1, the switch is actuated to terminate the electrical flow which deenergizes the sweeper. The relation between the switch 34 and stop arm 90 may correspond to the typical installation wherein two switches control a single light fixture or the like so that either can effect a successive change in the on or off condition of the fixture.

Figure 2:
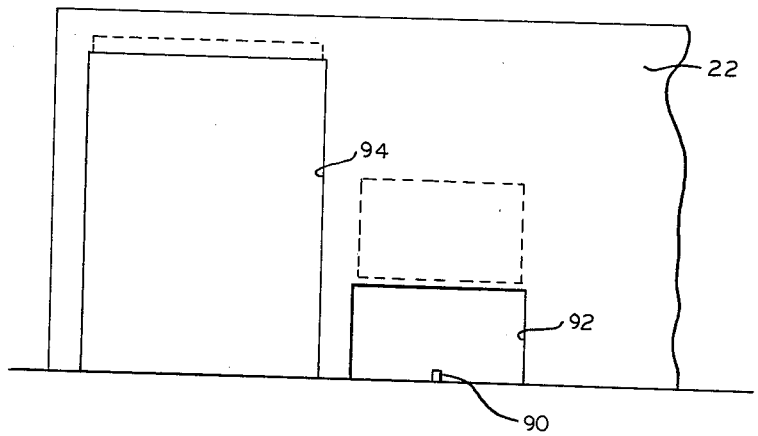
FIGURE 2 is a sectional view taken along line II—II of FIGURE 1.

The dishwasher 38 is carried on a vehicle similar to the one shown and described in connection with FIGURES 3 and 4. As illustrated in FIGURES 1 and 2, the dishwasher is housed within the cabinet 22 and moves through the opening 94 at the front of the cabinet, to the table 14 for loading and moves back into the cabinet for storage. The cabinet with the openings 92 and 94 in its face for receiving the sweeper 36 and dishwasher 38, may be provided with doors over the openings which will automatically open when the appliances are activated. The doors then can be arranged to automatically close as the appliances return to their storage position and the door constructions may be of the roll-up or swing-up arrangement, operated by suitable mechanism which need not be shown in detail.

The dishwasher may be actuated by pressing a control button on the control panel 32, or by a control 96 on the serving and dining table 14. The motor for driving the conveying vehicle is then energized through a guide track 98 in the floor, which may be of substantially the same construction as that employed for the sweeper, but with points of intersection between the tracks 40 and 98 being characterized by inter-opening of the slots with the electrical lines crossing therein in preferably insulated relation, it being noted that no interruption of the contact sufficient to prevent actuation of the respective appliances will be necessitated by such construction and the described intersection may, of course, be eliminated where, for example, the path 98 is spaced below the path 40 or the paths are installed individually. The dishwasher will then begin its travel following the path 98, and move to an operating position beside the table 14. The dishwasher may be stopped by the control 96 or may be automatically stopped by a control switch 100 on the dishwasher cabinet 38. The operator then fills the dishwasher with the soiled dishes and again actuates the control 96 whereupon the dishwasher will travel back along its path 98 to its original storage position within the storage cabinet 22. A control switch 102 may be located on the back of the dishwasher cabinet to strike the wall 24 at the back of the housing cabinet for stopping the dishwasher travel when it reaches its return storage position. At that location, the dishwasher may be operated to perform its dish washing function automatically. The dish washing appliance may be of a conventional type, and be supplied with electricity and water, such as from a fitting 104 mounted on the back well 24 of the cabinet which the dishwasher engages in operative relationship in following its path of travel back into the storage cabinet. The dishwasher may then be used as a storage cabinet retaining the dishes until they are again needed for serving and dining. At that time, the dishwasher may be used as a supply vehicle and again be brought out automatically to its position adjacent the table, whereupon the dishes can be set onto the table. While the dishes are being used, the appliance may again be returned to the storage cabinet 22, and the control 96 will prevent the dishwasher from going through its dish washing operation, unless it is loaded with soiled dishes.

In the control switch circuit provided in the rooms, shown in FIGURE 1, suitable electrical wiring is provided between the controls 34 and 96, and the power supplying tracks 40 and 98.

If desired, means may also be provided as a safety means to prevent the vehicle from continuing on its course in the event some form of obstruction is encountered such as a chair or the like. To this end, I have shown schematically in FIGS. 3 and 4 a bumper 106, on the forward end of the vehicle which is so adapted and arranged that upon encountering an obstacle it will be depressed so as to actuate a safety switch 108 interposed in the circuit between the contacts 84 and the motor 62 thereby to interrupt the flow of current to the motor until such time as the obstacle is removed. This safety control may also take the form of what is commonly called a "proximity switch" which will be actuated whenever the vehicle comes into proximate relationship with an obstruction in the normal path thereof.

Thus, it will be seen that I have provided improvements in home appliances which meet the objectives hereinbefore set forth. The automatically controlled appliances reduce to a minimum the amount of effort and attention necessary for operation by the housewife, and also improve the actual function of the appliance. The time of operation is reduced, as well as the effort necessary in many instances, and it is possible to perform a plurality of operations at the same time, thus reducing the total time required for performing the housework necessary for the maintenance of the home. It will be recognized that while the principles of the invention are described in connection with the use of a sweeper and a dishwasher, adaptation can be made to numerous other appliances in the home.

I have, in the drawings and specification, presented a detailed disclosure of the preferred embodiments of my invention, but it is to be understood that I do not intend to limit the invention to the specific forms disclosed, but intend to cover all modifications, changes and alternative constructions falling within the scope of the principles taught by my invention as set forth in the hereunto appended claims.

I claim as my invention:

1. A home appliance system comprising an appliance, guide means defining a path for the appliance, vehicular means for carrying the appliance along the path defined by the guide means, power means for the vehicular means, means located in the guide means for continuously supplying the power means with electrical power, steering means on said vehicular means and magnetic means in said guide means and magnetically associated with said steering means for controlling the movement of the vehicular means along said guide path.

2. A home appliance system comprising an appliance, guide means defining a tortuous path for the appliance, whereby the appliance may substantially cover a predetermined restricted floor area or the like, vehicular means for carrying the appliance along the path defined by the guide means, power means for the vehicular means, means located in the guide means for continuously supplying the power means with electrical power, steering means on said vehicular means and magnetic means in said guide means and magnetically associated with said steering means for controlling the movement of the vehicular means along said guide path.

3. A home appliance system comprising an appliance, guide means defining a path for the appliance, vehicular means for carrying the appliance along the path defined by the guide means, power means for the vehicular means, means located in the guide means for continuously supplying the power means with electrical power, steering means on said vehicular means, magnetic means in said guide means and magnetically associated with said steering means for controlling the movement of the vehicular means along said guide path, and means for automatically starting and stopping the power means when the vehicle is moved to a predetermined location on said guide path.

4. A home appliance system comprising a plurality of appliances adapted to automatically perform individual functions, guide means defining a path for each of said appliances, vehicular means for each of said appliances for carrying the appliance along the path therefor defined by the guide means thereof, power means for the vehicular means, means located in the guide means for continuously supplying the power means with electrical power, steering means on said vehicular means, magnetic means in said guide means and magnetically associated with said steering means for controlling the movement of said vehicular means along said guide paths, housing means for said appliances, and control means for individually moving each of said appliances out of said housing means and along the path of said appliance.

5. A home appliance system comprising an automatic dishwashing appliance, guide means defining a path for said appliance, vehicular means for carrying the appliance along the path defined by the guide means, power means for the vehicular means, means located in the guide means for continuously supplying the power means with electrical power, steering means on said vehicular means, magnetic means in said guide means and magnetically associated with said steering means for controlling the movement of the vehicular means along said guide path, a storage station for said dishwashing appliance, a serving station for said dishwashing appliance, and control means operatively connected with said power means for moving the dishwashing appliance between said stations.

References Cited in the file of this patent

UNITED STATES PATENTS

| | | |
|---|---|---|
| 1,919,132 | Riley | July 18, 1933 |
| 1,935,158 | Lumley | Nov. 14, 1933 |
| 2,104,062 | Temple | Jan. 4, 1938 |
| 2,502,265 | Macon | Mar. 28, 1950 |
| 2,661,750 | McNairy | Dec. 8, 1953 |
| 2,690,626 | Gay | Oct. 5, 1954 |

FOREIGN PATENTS

| | | |
|---|---|---|
| 722,755 | France | Jan. 5, 1932 |